United States Patent
Clebsch et al.

(10) Patent No.: US 10,592,661 B2
(45) Date of Patent: Mar. 17, 2020

(54) PACKAGE PROCESSING

(71) Applicant: Microsoft Technology Licensing, LLC, Redmond, WA (US)

(72) Inventors: Sylvan Wesley Clebsch, Cambridge (GB); Marc Manuel Johannes Brockschmidt, Cambridge (GB); Syed Samin Ishtiaq, Cambridge (GB); Jade Ella Carla Alglave, Cambridge (GB); Matthew John Parkinson, Cambridge (GB); Andrew Madison Kent, Bloomington, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 15/823,435

(22) Filed: Nov. 27, 2017

(65) Prior Publication Data

US 2019/0163898 A1   May 30, 2019

(51) Int. Cl.
| | | |
|---|---|---|
| *G06F 21/00* | (2013.01) | |
| *G06F 21/51* | (2013.01) | |
| *G06F 21/53* | (2013.01) | |
| *G06F 21/12* | (2013.01) | |
| *H04L 9/32* | (2006.01) | |
| *H04L 12/24* | (2006.01) | |
| *H04L 29/06* | (2006.01) | |
| *G06F 21/74* | (2013.01) | |

(Continued)

(52) U.S. Cl.
CPC ........... *G06F 21/51* (2013.01); *G06F 21/12* (2013.01); *G06F 21/53* (2013.01); *H04L 9/3263* (2013.01); *H04L 41/0893* (2013.01); *H04L 63/126* (2013.01); *G06F 21/123* (2013.01); *G06F 21/57* (2013.01); *G06F 21/575* (2013.01); *G06F 21/602* (2013.01); *G06F 21/74* (2013.01)

(58) Field of Classification Search
CPC ................. G06F 21/51; H04L 9/3263
USPC ........................................... 726/22
See application file for complete search history.

(56) References Cited

U.S. PATENT DOCUMENTS 6,253,193 B1 *  6/2001  Ginter ............... G06F 21/10
                                                    348/E5.006
7,424,610 B2    9/2008  Ranganathan
(Continued)

OTHER PUBLICATIONS

"Code signing—Wikipedia", Retrieved From: https://en.wikipedia.org/wiki/Code_signing, Nov. 7, 2017, 5 Pages.

(Continued)

*Primary Examiner* — Longbit Chai

(57) ABSTRACT

In various examples, there is a computer-implemented method for providing packages for processing on a computer system. The method creates a secure connection to an enclave and retrieves a quote to verify that the enclave is genuine and that it contains a predetermined process. The predetermined process is configured to create an enclave for itself and determine that an initial state of the computer system is equivalent to a predetermined state based on a quote retrieved from a security module. The predetermined process is further configured to receive a package to be processed by the computer system and cause the processor to process the package outside of the enclave. In response to verifying the enclave, the method provides a package to be processed by the computer system.

20 Claims, 11 Drawing Sheets

(51) Int. Cl.
G06F 21/57 (2013.01)
G06F 21/60 (2013.01)

(56) References Cited

U.S. PATENT DOCUMENTS

| | | | |
|---|---|---|---|
| 8,438,618 B2 | | 5/2013 | Eldar et al. |
| 9,184,918 B2 * | | 11/2015 | Spiers ................. H04L 63/0218 |
| 9,584,517 B1 | | 2/2017 | Roth et al. |
| 2014/0007087 A1 | | 1/2014 | Scott-Nash et al. |
| 2015/0186680 A1 | | 7/2015 | Johnson et al. |
| 2016/0350534 A1 * | | 12/2016 | Poornachandran ..... G06F 21/57 |

OTHER PUBLICATIONS

"Software Restriction Policies", Retrieved From: https://docs.microsoft.com/en-us/windows-server/identity/software-restriction-policies/software-restriction-policies, Nov. 15, 2017, 27 Pages.

Maene, et al., "Hardware-Based Trusted Computing Architectures for Isolation and Attestation", in Proceedings of the IEEE Transactions on Computers, vol. 67, Issue 3, Mar. 1, 2018, 14 Pages.

"International Search Report and Written Opinion Issued in PCT Patent Application No. PCT/US2018/061162", dated Feb. 5, 2019, 12 Pages.

Bare, J. Christopher, "Attestation and Trusted Computing", in Journal of Practical Aspects of Modern Cryptography, Mar. 2006, pp. 1-9.

Beekman, Jethro Gideon, "Improving Cloud Security using Secure Enclaves", in Technical Report No. UCB/EECS-2016-219, Dec. 22, 2016, 72 Pages.

* cited by examiner

PACKAGE PROCESSING

BACKGROUND

The technology generally relates to computer security and more specifically to computer systems which allow users to verify that a remote computer system conforms to an expected configuration before providing code and/or data to be processed by the computer system.

In a cloud computing environment, users may make use of remote computer systems within the cloud computing environment to carry out processing tasks on their behalf. Users may therefore provide the computer systems within the cloud computing environment with code to be executed and data to be processed. If a user cannot confidently determine the current configuration of the remote computer systems that they are interacting with, they may be dissuaded from using the cloud computing environment to process code and/or data, especially if that code and/or data is sensitive.

A Trusted Execution Environment (TEE), is a secure area of a processor which guarantees that code and data within the secure area is protected with respect to confidentiality and integrity. Two technologies which provide instantiations of a TEE are Trusted Platform Modules (TPMs) and enclaves.

Trusted Platform Modules (TPMs) are security modules which may be used as part of a computer system to ensure that the computer system is in an expected configuration when it is started up. A TPM securely stores measurements of the code modules that are executed by the computer system whilst it is starting up (which is commonly referred to as booting or the boot process or procedure). These measurements can be used to verify that the correct (i.e. untampered with) code modules were executed by the computer system as part of its boot process. However, a TPM only allows users to verify that the boot process was completed successfully (i.e. that the expected code modules were all executed), it does not allow a user to verify that the current configuration of a computer system is as expected as it does not provide any information about processes that have been executed by the operating system or runtime environment after the boot has been completed.

Another technology which enables a user to partially verify the state of a computing system is the use of enclaves. As an example, an enclave may be created using Microsoft® Virtual Secure Mode (VSM). Alternatively, Intel® processors may include Software Guard Extensions (SGX) instructions which allow a secure enclave to be created. However, other mechanisms for creating enclaves can be used, such as AMD® Secure Encrypted Virtualization (SEV). The code and data for a particular process may be stored and/or processed within an enclave. Data and processing within the enclave is protected from other processes that may be being executed within the computer system, helping to ensure its confidentiality and integrity. Enclaves typically provide an enclave quoting mechanism which enables a user to verify that a process is actually operating inside a valid enclave and also the state of the enclave (e.g. the actual process that is within the enclave). However, whilst these quoting mechanisms enable a user to verify the execution environment of a process within an enclave, it does not provide any verification as to the overall configuration of the computer system (i.e. including any processes that are running outside of the enclave). Furthermore, the computing environment that is provided to a process executing within an enclave is typically relatively limited since it does not have access to higher performance hardware such as graphical processing units (GPUs), networks and so on.

The embodiments described below are not limited to implementations which solve any or all of the disadvantages of known computer systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples, there is a computer-implemented method for providing packages for processing on a computer system. The method creates a secure connection to an enclave and retrieves a quote to verify that the enclave is genuine and that it contains a predetermined process. The predetermined process is configured to create an enclave for itself and determine that an initial state of the computer system is equivalent to a predetermined state based on a quote retrieved from a security module. The predetermined process is further configured to receive a package to be processed by the computer system and cause the processor to process the package outside of the enclave. In response to verifying the enclave, the method provides a package to be processed by the computer system.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

Figure 1:
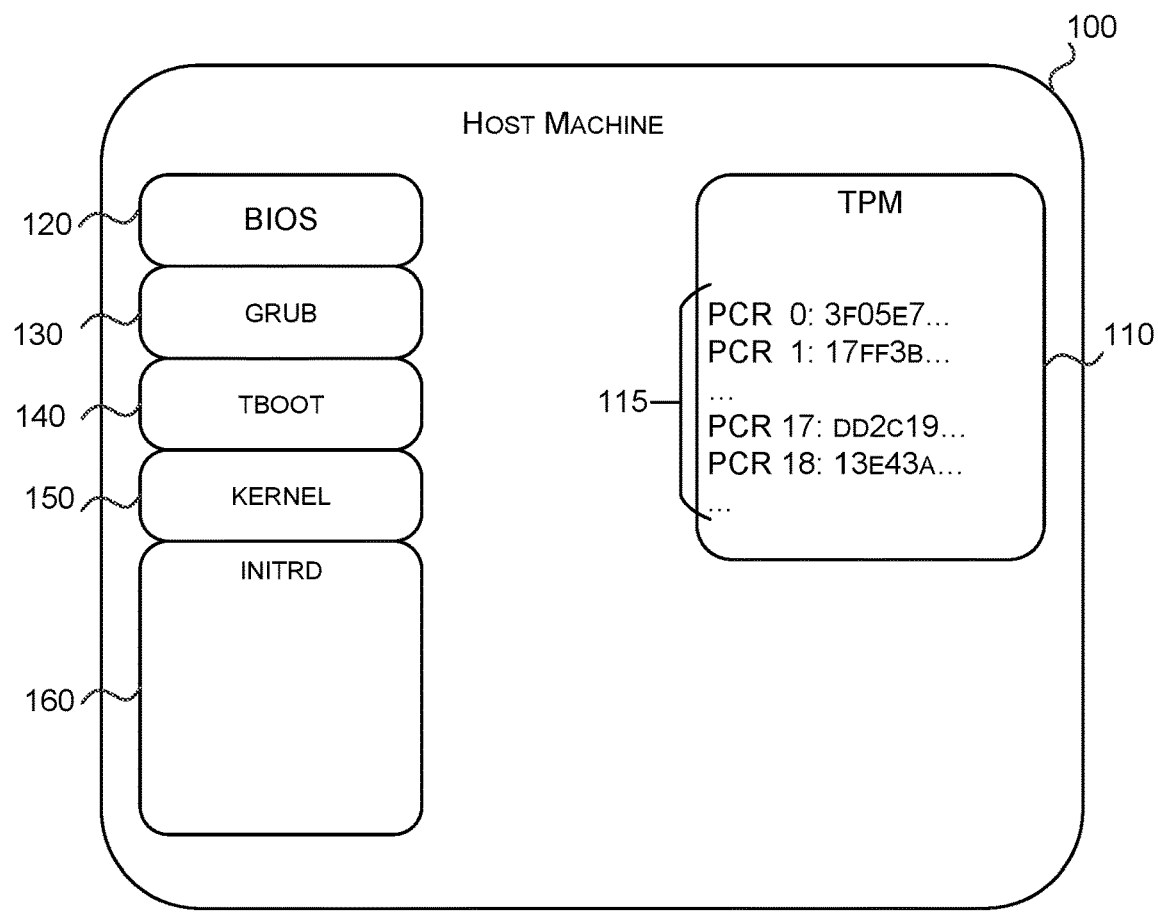
FIG. 1 is a schematic diagram of a host machine at the end of its boot process.

The detailed description provided below in connection with the appended drawings is intended as a description of the present examples and is not intended to represent the only forms in which the present examples are constructed or utilized. The description sets forth the functions of the example and the sequence of operations for constructing and operating the example. However, the same or equivalent functions and sequences may be accomplished by different examples.

In an example there is a system comprising: a processor; and a security module arranged to store data representing measurements of each of a plurality of code modules which are to be executed by the processor as part of a boot process for the system; wherein, the system is configured to cause the processor to execute an initial process after completion of the boot process, the initial process being operable to: create an enclave for the initial process, wherein a state of the enclave is remotely verifiable and processing performed by the initial process is performed from within the enclave; retrieve a quote from the security module, the quote comprising a representation of the measurements of the plurality of code modules executed by the processor during the boot process; determine that an initial state of the system is equivalent to a predetermined state based on the retrieved quote; and receive a package comprising code or data or both to be processed by the system; and cause the processor to process the package outside of the enclave.

In another example there is a computer-implemented method for providing packages for processing on a computer system, the method comprising: creating a secure connection to an enclave on the computer system; requesting an enclave quote from the enclave; verifying, using the enclave quote, that the enclave is a genuine enclave and that the process running in the enclave is a predetermined process which is configured to determine that the initial state of the computer system is equivalent to a predetermined state, the predetermined state comprising the predetermined process being executed as an initial process after completion of a boot process for the computer system, and receive one or more packages for processing and cause the one or more packages to be processed outside of the enclave; and in response to verifying that the enclave is a genuine enclave and the process running in the enclave is the predetermined process: provide a package comprising code or data or both to be processed by the computer system using the secure connection.

By verifying that the enclave is a genuine enclave and that the process running in the enclave is a predetermined process which is configured to determine whether the initial state of the computer system is equivalent to a predetermined state, the method can indirectly determine that only trusted modules have been loaded as part of the boot process. In other words, by verifying the behavior of the process to which it is connected conforms to a predetermined (or expected) process, the method can indirectly verify the boot-state of the computer system. This is because the method can verify that the process will check that the initial state of the computer system corresponds to the predetermined state.

Additionally, because the predetermined state of the computer system is one in which the predetermined process is loaded as an initial process, the method can indirectly verify that the predetermined process is being run as an initial process on the computer system. Because the method is able to verify that the initial process is loaded as an initial process, the method can also determine whether the post-boot environment of the computer system can be trusted. This is because it can be determined whether the initial process conforms to a predetermined process which operates to load packages in a way which is acceptable. In some examples, the package that is provided the system further comprises a policy indicating whether another package is permitted to be processed on the same system as the package and the initial process on the system is further operable to: store the policy within the enclave; receive one or more subsequent packages comprising code or data or both; and, for each subsequent package: determine whether that subsequent package is permitted to be processed on the same system as packages previously processed by the system based, at least in part, on whether policies already stored within the enclave permit the subsequent package to be processed on the same system; and if the subsequent package is permitted to be processed by the system, cause the processor to process the subsequent package outside of the enclave. This means that packages can be provided to the system together with a policy and that the provider of a package can trust that the system will not process any packages which are not permitted by the policy provided with the package. This is because the provider can determine that the process that it provides the package to is a predetermined process which will operate in this manner to prevent any other packages being processed which contradict the provided policy.

Although the present examples are described and illustrated herein as being implemented in a computer system, the system described is provided as an example and not a limitation. As those skilled in the art will appreciate, the present examples are suitable for application in a variety of different types of computer systems.

FIG. 1 is a schematic diagram of a host machine 100 (or computer system) at the end of its boot process. The host machine comprises a trusted platform module (TPM) 110 and a plurality of code modules 120, 130, 140, 150 and 160 which have been executed by a processor of the host machine during its boot process.

The TPM 110 comprises a plurality of Platform Configuration Registers (PCRs) 115, which are used to securely store and report security relevant metrics. These registers are of a suitable size for storing a digest which is generated by a hashing algorithm. They are zeroed when the host machine 100 starts and cannot be directly written to. Instead, the TPM 110 allows these PCRs 115 to be extended with new values. In particular, the TPM 110 extends a particular PCR with a new value by combining the new value with the existing value of the PCR being extended, hashing the combined data and then storing the digest of the combined data that is produced by the hash as the new value of the PCR. As a result of this extension mechanism, the PCRs 115 of the TPM 110 are able to securely store security relevant metrics or measurements for the host machine 100.

One use of the TPM 110 is to keep track of the state of the host machine 100 through its boot process. A boot process (or procedure or start-up procedure) for a computer system, such as host machine 100, is an automatic process which brings a computer system from a powered off state into a state where an operating system or runtime environment is running on the computer system which enables a user to run programs on the computer system. Once an operating system or runtime environment is successfully running, the boot process is considered to be complete. In order to get an operating system or runtime environment up and running on a computer system, it is typically necessary for the boot process to execute a sequence of one or more different code (or software) modules, such as the plurality of code modules 120, 130, 140, 150 and 160. The boot process also occurs on restart of the computer system.

The TPM 110 keeps track of the host machine 100 through its boot process by using the PCRs 115 of the TPM 110 to securely record (or store) measurements, such as hashes or signatures, of the code modules 120, 130, 140, 150 and 160 which are executed by the host machine 100 during the boot process. The state of the computer system is verifiable following the boot process by checking that the PCRs 115 contain the expected values. If different or additional or fewer code modules from those that are expected were to be executed during the boot process, it is highly unlikely that the PCRs would contain the correct values. Therefore, if the PCRs 115 contain the expected values there is a very reliable indication that the expected code modules (and only the expected code modules) have been executed during the boot process.

To allow a user of the host machine 100 to check that the PCRs 115 contain the expected value, the TPM 110 provides a quoting mechanism which provides, on request, a TPM quote which includes a representation of the measurements of the plurality of code modules which were executed by the processor of the host machine 100 as stored in the PCRs 115. In examples, the TPM 110 quote is used to check that the PCRs 115 contain the expected value and that the boot process of the host machine was completed successfully (i.e. with the expected code modules being executed). However, whilst the TPM 110 allows users to verify that the boot process was completed successfully, it does not provide any information about the configuration of the host machine after the boot has been completed. In particular, once an operating system or runtime environment has been started, code modules (or packages) are executed without being monitored by the TPM 110.

A typical boot process for a modern computer system involves multiple code modules 120, 130, 140, 150, 160 being loaded in sequence. Generally (though not necessarily), each code module is increasingly complex and provides additional functionality from the previously execute code modules to allow the next code module to be loaded, until sufficient functionality has been provided to enable the operating system or runtime environment to be loaded.

The boot process starts with a first code module 120. The first code module 120 that is executed as part of the boot process is typically much smaller in size and complexity compared to an operating system or runtime that will eventually be loaded. The first code module 120 is typically loaded from a read-only memory, although, in some cases, other means of storing the first code module are used instead. As illustrated in FIG. 1, the first code module 120 may be a Basic Input/Output System (BIOS) code module. However, in some cases, other code modules are loaded as the first module 120 instead, such as a Unified Extensible Firmware Interface (UEFI) code module. Alternatively, a Power-On Self-Test (POST) (or other hardware integrity checking) module is the first code module 120 in the boot process with the BIOS being loaded as a subsequent boot module. However, POST modules may more typically be considered to occur pre-boot since in some cases they are carried out by hardware before any code modules are loaded. The first code module 120 typically provides a fundamental functionality, such as enabling access to hard drives to allow subsequent code modules 130, 140, 150, 160 to be loaded and executed to complete the boot process.

As part of the boot procedure, a measurement is made of the first code module 120. For example, a hash of the binary image which makes up the first code module 120 is used as a measurement. This measurement is then stored in the TPM 110 by extending one of the PCRs 115. This measurement is performed before, after or during the execution of the first code module 120 as long as it is performed before the next measurement is stored in the TPM (since the extension operation of the TPM 110 for writing to the PCRs 115 is non-commutative).

Once the first code module 120 has been executed, the boot process of the host machine 100 illustrated in FIG. 1 proceeds to load and execute a GRUB boot loader as a second code module 130. GRUB serves to provide functionality to understand file systems which is not typically provided by the BIOS. This is usually needed to load the later more complex modules (as well as the ultimate operating system or execution environment) which are normally stored within a file system and cannot therefore be accessed by the BIOS code module 120. The file system support provided by GRUB is relatively limited compared to later modules, serving simply to allow the later modules to be loaded and executed. Of course, in other examples, different code modules may be loaded as the second code module 130, including, for example, Microsoft's BOOTMGR or the LILO bootloader for Linux. The second code module 130 is measured in a similar manner the first code module 120 and the measurement is stored in the TPM 110 by extending one of the PCRs 115.

Once the second code module 130 has been executed, the boot process of the host machine 100 illustrated in FIG. 1 proceeds to load and execute a Trusted Boot (tboot) module as a third code module 140. This code module forms part of a secure boot process by verifying a digital signature of a kernel which is to be loaded as a subsequent code module in the boot process. The third code module 140 is measured in a similar manner to the first and second code modules 120 and 130 and the measurement is stored in the TPM 110 by extending one of the PCRs 115.

Once the third code module 140 has been executed, the boot process of the host machine 100 illustrated in FIG. 1 proceeds to load and execute a Kernel module as a fourth code module 150. This module provides wide ranging functionality for allowing processes to run on the host machine 100 including, for example, interacting with and managing various different types of memories and interfaces that are present, as well as various peripheral devices. As such, the Kernel module provides functionality to facilitate other processes to run. The fourth code module 150 is measured in a similar manner to the preceding code modules 120, 130 and 140 and the measurement is stored in the TPM 110 by extending one of the PCRs 115.

Once the fourth code module 150 has been executed, the boot process of the host machine 100 illustrated in FIG. 1 proceeds to load and execute an Initial Ramdisk (initrd) module as a fifth code module 160. This module is used to enable more advanced file systems (such as those on a RAID volume, encrypted partitions or file systems which similar require other special preparations in order to be mounted). The fifth code module 160 is measured in a similar manner to the preceding code modules 120, 130, 140 and 150 and the measurement is stored in the TPM 110 by extending one of the PCRs 115.

Whilst the boot process discussed above in relation to the host machine 100 illustrated in FIG. 1 comprises five code modules 120, 130, 140, 150 and 160, it will be appreciated that a different (either greater or fewer) number of modules may be used. Indeed, in some embodiments, the boot process may comprise a single code module. This may be more suitable, for example, in embedded systems where basic functionality is provided. Furthermore, although specific code modules have been discussed above in relation to the boot process for the host machine 100 illustrated in FIG. 1, it will be appreciated that other code modules may be used instead. In other words, the code modules comprised in the boot process for other examples differ in terms of the number of code modules, the type of code modules, or both. Similarly, although the host machine 100 illustrated in FIG. 1 makes use of a TPM 110 as a security module to store the measurements of the code modules 120, 130, 140, 150 and 160 that are executed as part of the boot process for the host machine 100, it will be appreciated that a different type of security module which provides secure storage and quoting of these measurements is used in some examples.

Figure 2:
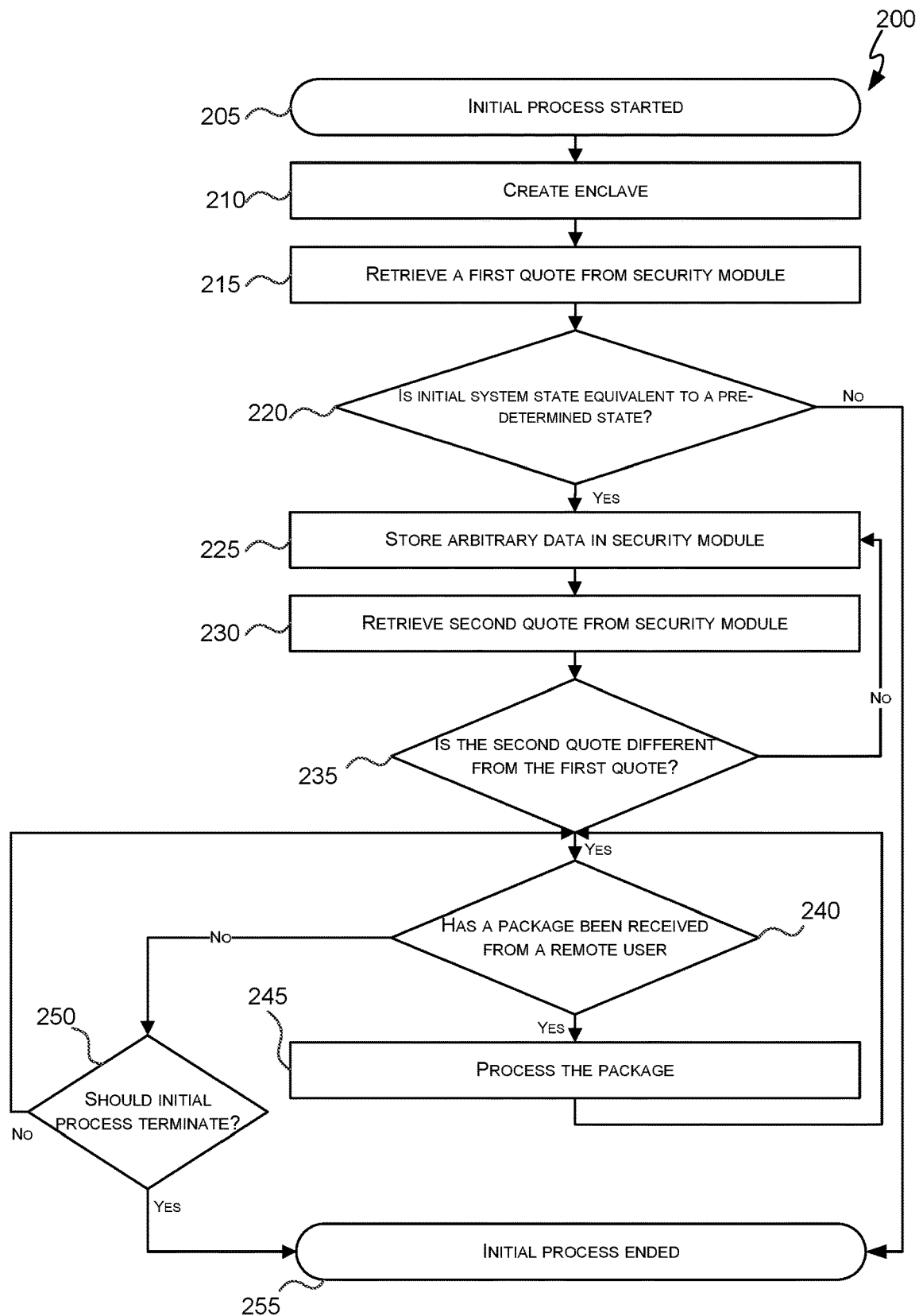
FIG. 2 is a flow diagram of a method for execution as an initial process on the host machine illustrated in FIG. 1.

FIG. 2 is a flow diagram of a method 200 for execution as an initial process on the host machine 100 illustrated in FIG. 1. The initial process is so-called because it is the first process to be run after completion of the boot process for the host machine 100. The method 200 is started 205 when the boot process for the host machine 100 has been completed. That is to say, execution of the method 200 is begun once the final code module 160 that forms part of the boot process has been executed. Hence, the method 200 is run as an initial process after the boot process has been completed. Therefore, the execution of the method 200 as an initial process is caused by one of the code modules executed during the boot process. This method 200 is now discussed in conjunction with FIG. 3 which is a schematic diagram of the host machine 100 illustrated in FIG. 1 with the method 200 running as an initial process.

At an operation 210, the method 200 creates an enclave 300 for the initial process. For example, the processor of the host machine 100 supports SGX instructions and the initial process comprises code which issues SGX instructions to the processor to create an enclave 300 for the initial process. However, other ways of creating an enclave 300 for the initial process are used in some examples. By operating within the enclave 300, the data and code for the initial process are protected from other processes which are operating on the host machine 100 outside the enclave. This means that other processes operating on the host machine 100 cannot tamper with or otherwise alter the code and data for the initial process. Therefore, by operating within an enclave, the correct operation of the initial process is assured. The current state of the enclave 300 is remotely verifiable. For example, the enclave provides an enclave quoting mechanism which enables a user (either local or remote to the system) to request a quote which may be used to verify that the process that they are communicating with is operating inside a valid enclave, as well as the state of the enclave 300 itself. Therefore, using this quoting mechanism, a user is able to test that the initial process is the initial process that they were expecting to communicate with (e.g. rather than a tampered version or emulation of the initial process) and that the initial process is operating inside of an enclave. However, it will be appreciated that other mechanisms for allowing the current state of the enclave 300 to be verified are used in some examples.

At an operation 215, the method 200 requests a quote 310 from the TPM 110. The quote 310 (referred to as a TPM quote where the security module is a TPM 110 or a security module quote where it is not), includes a representation of the measurements of the plurality of code modules which were executed by the processor of the host machine 100 during its boot process. Where the security module is a TPM 110, the quote 310 is signed to provide an assurance that the quote that is received was actually generated by the TPM 310. Similar assurances are also provided by other types of security module in some examples. Therefore, when the quote 310 is received, the method 200 is able to verify that the quote 310 was actually issued by the TPM 310.

At an operation 220, the method 200 determines whether an initial state of the system (or system state) is equivalent to a predetermined state based on the retrieved quote 310. The initial state of the system refers to the state that the system is in immediately following the completion of the boot process (i.e. at the point that the initial process is started). Of course, it will be appreciated that the quote 310 itself may not be retrieved immediately following the completion of the boot process. However, the contents of the quote 310 are representative of the state of the system upon completion of the boot process. The method 200 uses the representation of the measurements of the plurality of code modules to check that the correct code modules were executed during the host machine's boot process. If the correct code modules were executed, the representation of the measurements of those code modules contained in the quote 310 match predetermined value(s) associated with the predetermined state. However, if different or additional (or fewer) code modules were executed, the representation of the measurements of the code modules contained in the quote 310 is highly unlikely to match the predetermined value(s). Therefore, if the representation of the measurements of those code modules contained in the quote 310 match the predetermined value(s), the method 200 determines that the initial state matches the predetermined state. By verifying that the initial state of the system is equivalent to a predetermined state, the method can verify that only trusted (i.e. predetermined) components were executed during the boot process.

The predetermined state of the host machine 100 is only likely reached if the code modules which are expected by the initial process have been executed during the boot process. As discussed above, the execution of the method 200 as an initial process on the host machine 100 is caused by one of the code modules which is executed during the boot process. Therefore, the execution of the method 200 as an initial process on the machine (as opposed to a subsequent process) is guaranteed because it is implicit in the boot process that the boot process launches the method 200 as the initial process. In other words, if the boot process were modified to cause some other process to be executed as the initial process, the representation of the measurements contained in the quote 310 would not match the predetermined value(s) associated with the predetermined state.

If the initial system state of the host machine 100 is not equivalent to the predetermined state (as determined based on the quote retrieved from the TPM 110), the method 200 acts to prevent packages from being received or processed by the initial process. As an example, the method 200 terminates the initial process, in which case the method 200 proceeds to end at an operation 255. However, other ways of preventing packages from being received or processed by the initial process are used in some cases. The method 200 takes other optional actions if the initial system state does not match the predetermined state, such as issuing notifications to an administrator or causing a reset of the software on the machine.

In addition to using the quote 310 to determine whether the initial state of the host machine 100 matches the predetermined state, the method 200 stores the quote 310 inside the enclave 300 for future use. By storing the quote 310 inside the enclave 300, it is inaccessible by any other processes operating on the host machine 100. Of course, the method 300 need not store the quote 310 if it will not be needed for future use.

As part of operation 220, the method 200, optionally, sets an owner password for the TPM 110. This password is stored in the TPM 110 sealed to the current state of the machine (i.e. to the initial state of the machine following a successful correct boot process). This means that the password can only be retrieved when the PCRs 115 contain the correct measurements which correspond to the initial state. Therefore, on subsequent reboots of the host machine 100, the initial process is able to access the TPM owner password from the TPM 110. This TPM owner password is used in order to be permitted to carry out various functions on the TPM 110, such as extending the PCRs 115 or requesting quotes.

Figure 3:
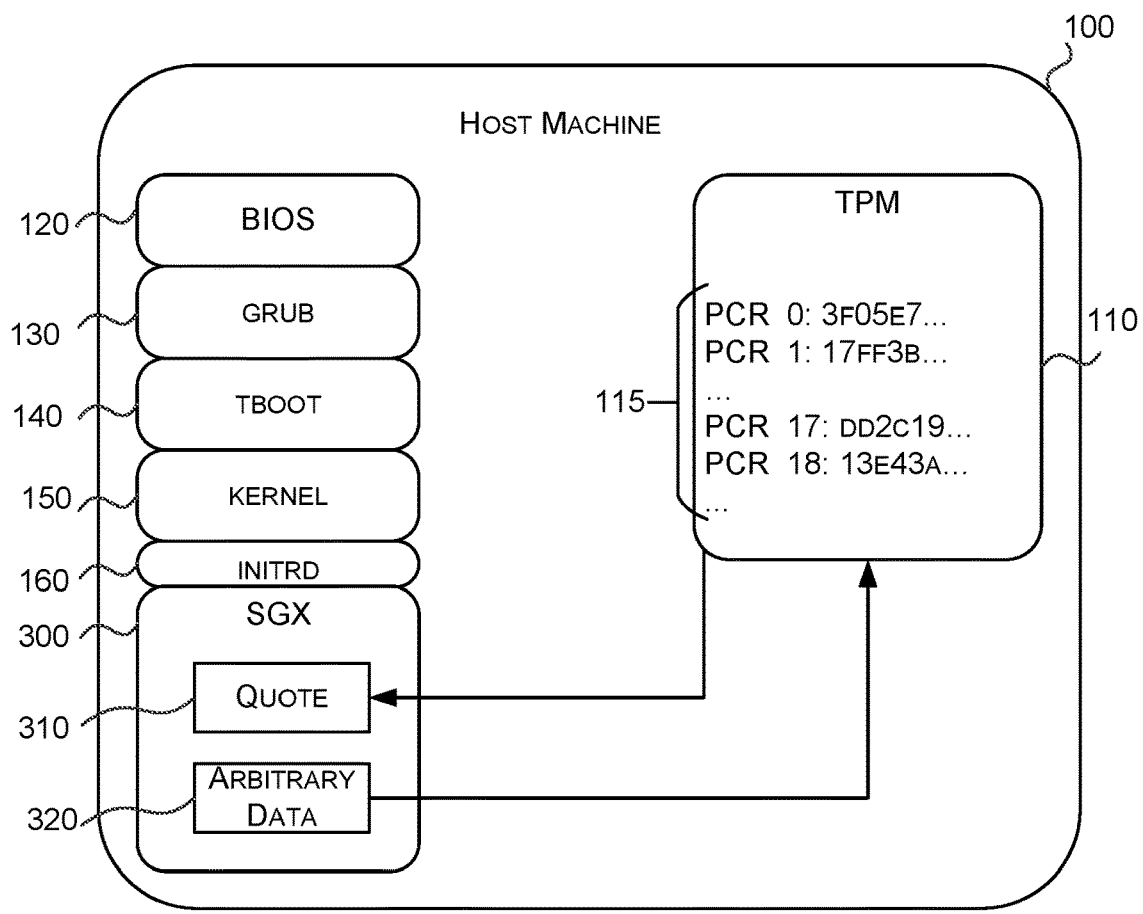
FIG. 3 is a schematic diagram of the host machine of FIG. 1 with the initial process of FIG. 2 running.

At an operation 225, the method 200 instructs the TPM 110 to store arbitrary data 320 as one or more additional measurements. The arbitrary data 320 is randomly (or pseudo-randomly) generated data or is predetermined. The TPM 110 stores the arbitrary data 320 by extending the values stored in the relevant PCRs 115. Therefore, the values stored in the PCRs 115 of the TPM 110 are different from those which were present immediately following completion of the boot process. This means that any subsequently retrieved quote from the TPM 110 will contain a different representation of the measurements from that contained in the quote 310 retrieved in operation 215. This prevents an additional version of the method 200 from being run in another process which is executed subsequent to the initial process because the quote 310 which would be retrieved by the method 200 running in another process would not contain a representation of the measurements which corresponds to the predetermined state (which would otherwise correspond to the predetermined state if the boot process had caused the method 200 to also be run in an initial process). As illustrated in FIG. 3, following completion of this operation, the values stored in the PCRs 115 of the TPM 110 are different from those following the boot of host machine 100 as shown in FIG. 1. This also means that, where the TPM owner password has been stored in the TPM 110 sealed to the initial state of the host machine 100 in operation 220, the owner password is no longer be retrievable by any other process (since the PCRs 115 no longer contain the correct measurements which correspond to the initial state). This helps prevent other processes from attempting to mimic the initial process, since only the initial process is able to obtain the owner password from the TPM 110.

To verify that the measurements stored in the PCRs 115 of the TPM 110 no longer match the predetermined state of the host machine 100, the method 200, at an optional operation 230, retrieves a second quote from the TPM 110. The second quote includes a representation of the measurements that are stored in the TPM 110 following the storage of the arbitrary data 320 as one or more additional measurements.

Having retrieved the second quote at the optional operation 230, the method 200, at an optional operation 235, determines whether the measurements represented in the second quote are the same as the measurements represented in the quote that was originally retrieved at operation 215. If the measurements are the same between the two quotes, the method returns to operation 225 to store additional arbitrary data as one or more additional measurements and checks whether a quote retrieved after storing the additional arbitrary data matches the original quote retrieved at operation 215. The method 200 repeats these operations until the two quotes are different. Alternatively, the method 200 ceases its processing if the two quotes match. This serves to prevent the method 200 from receiving or processing packages in the subsequent operations of the method 200 if the quotes remain the same.

At an operation 240, the method 200 waits to receive a package comprising code or data or both to be processed by the system. When a package is received, the method 200 proceeds to an operation 245. Periodically, while waiting for a package to be received, the method 200, at an operation 250, determines whether the initial process should terminate. This termination of the initial process is, for example, a result of a shutdown or reboot signal being issued for the host machine 100. If it is determined that the initial process is to terminate, the method 200 proceeds to end at an operation 255. However, if it is not determined that the initial process should terminate, the method 200 continues to wait for a package to be received for processing.

At an operation 245, once a package has been received, the method 200 causes the processor to process the package. This operation will be discussed in more detail below in conjunction with FIGS. 6, 7, 8, 9 and 10.

Figure 4:
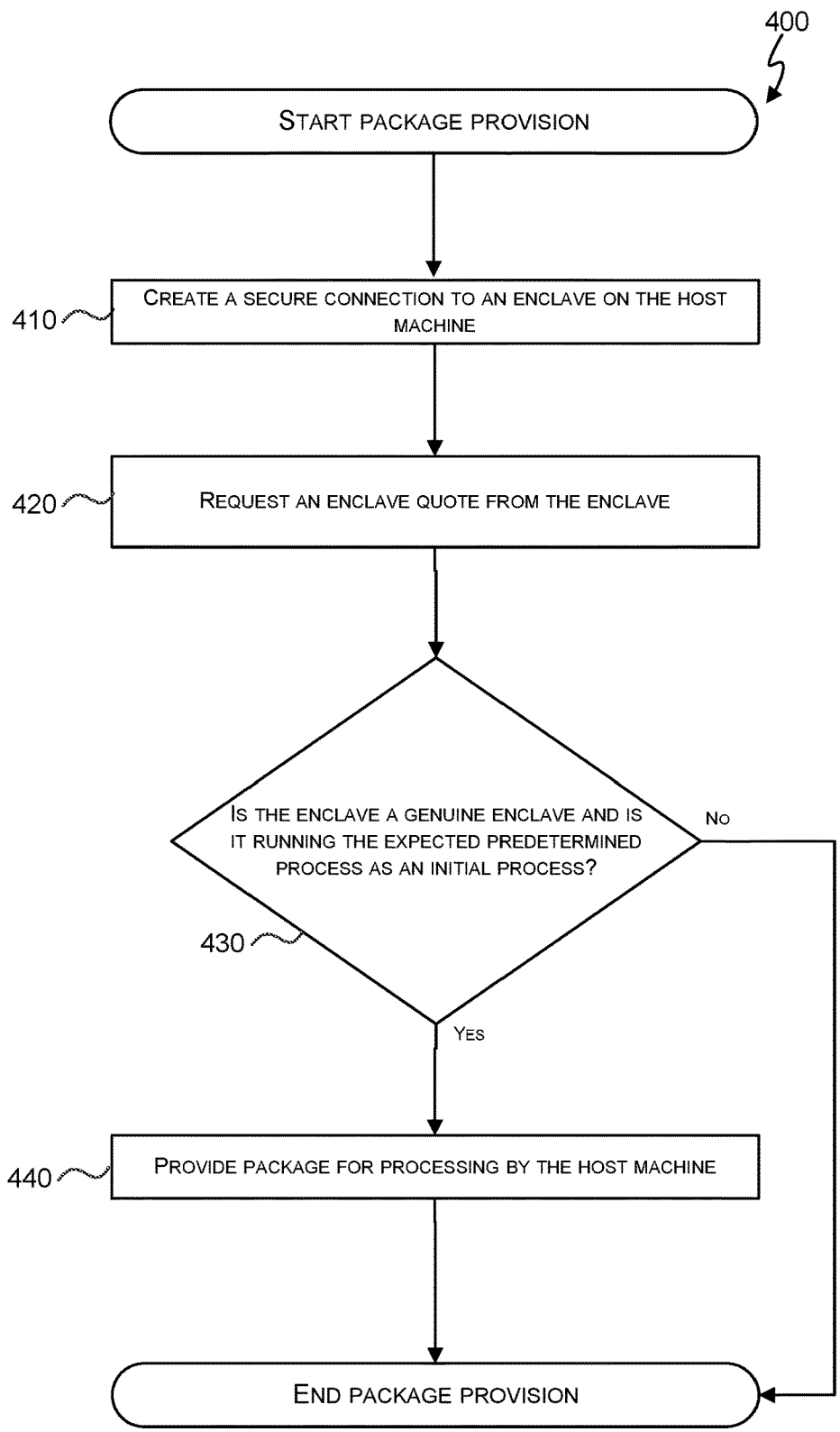
FIG. 4 is a flow diagram of a method for providing packages for processing to the host machine of FIG. 3.

FIG. 4 is a flow diagram of a method 400 for providing packages for processing to the host machine illustrated in FIG. 3. This method 400 will be discussed in conjunction with FIG. 5 which is a schematic diagram of the host machine of FIG. 3 being verified by a remote user.

At an operation 410, the method 400 starts a package provision method 400 by creating a secure connection 510 to the enclave 300 on the host machine 100. For example, the method 400 creates a TLS connection to the enclaved initial process. The TLS connection uses a self-signed certificate, which is later verified in a subsequent operation. This avoids the need for certificate provisioning.

At an operation 420, the method 400 requests a quote 515 from the enclave 300. The quote 515 is referred to as an enclave quote or, where the enclave 300 is created using SGX instructions supported by a processor, as an SGX quote. The quote 515 enables the enclave and its contents to be verified.

At an operation 430, the method 400 uses the quote 515 to verify that the enclave 300 is a genuine enclave and that the process running in the enclave is a predetermined process which is executed as an initial process on the host machine 100. The verification of the enclave as being a genuine enclave means that the enclave was created by a trusted system, such as by a process in response to an SGX instruction, and that the integrity and confidentiality of the contents of the enclave will therefore be protected by the trusted system. If the initial process is being run outside of an enclave, or within a simulated enclave that is created by a non-trusted system (and which may not provide the required guarantees for the integrity and confidentiality of the contents of the enclave), the enclave will not be verified as a genuine enclave. It will be appreciated that there are numerous different techniques which can be used to verify an enclave. In some examples, verifying that the enclave is a genuine enclave comprises providing the quote (or part of the quote) to an enclave attestation service 520 to verify that the quote was produced by a genuine enclave. For example, where the enclave 300 is an SGX enclave, the enclave attestation service 520 may be an Intel® SGX enclave attestation service. The attestation service 520 checks the quote to verify that the quote has been signed by a known key which has been provisioned to processors for creating enclaves. The attestation service 520 provides an indication that the quote originates from a genuine enclave if the quote has been signed by a known key. Otherwise, in other examples, this check is performed by the method 400 itself.

At an operation 440, the method 400 provides a package to the host machine 100 for processing. This is the last operation of the package provision method 400.

Figure 5:
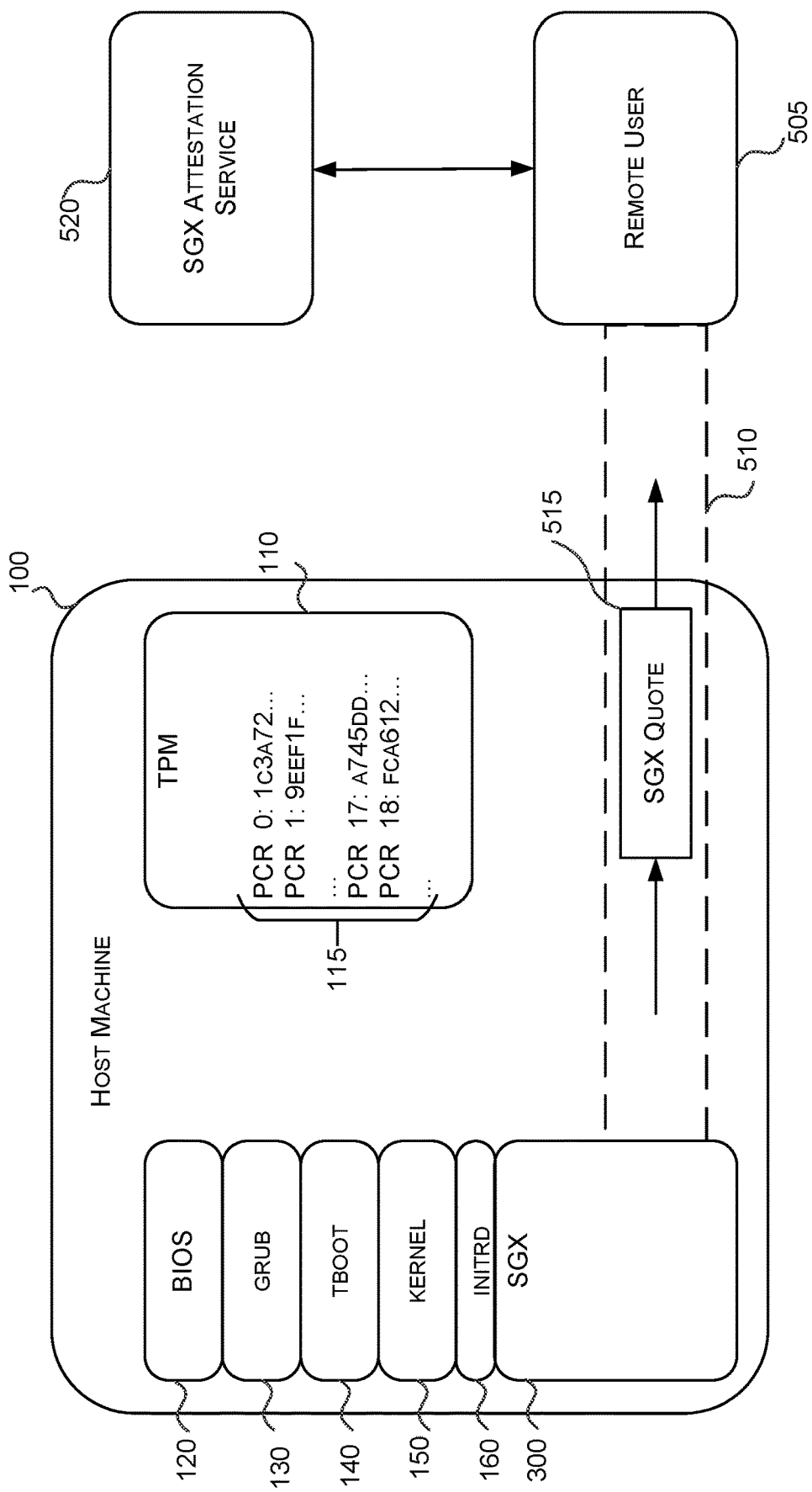
FIG. 5 is a schematic diagram of the host machine of FIG. 3 being verified by a remote user.
Figure 6:
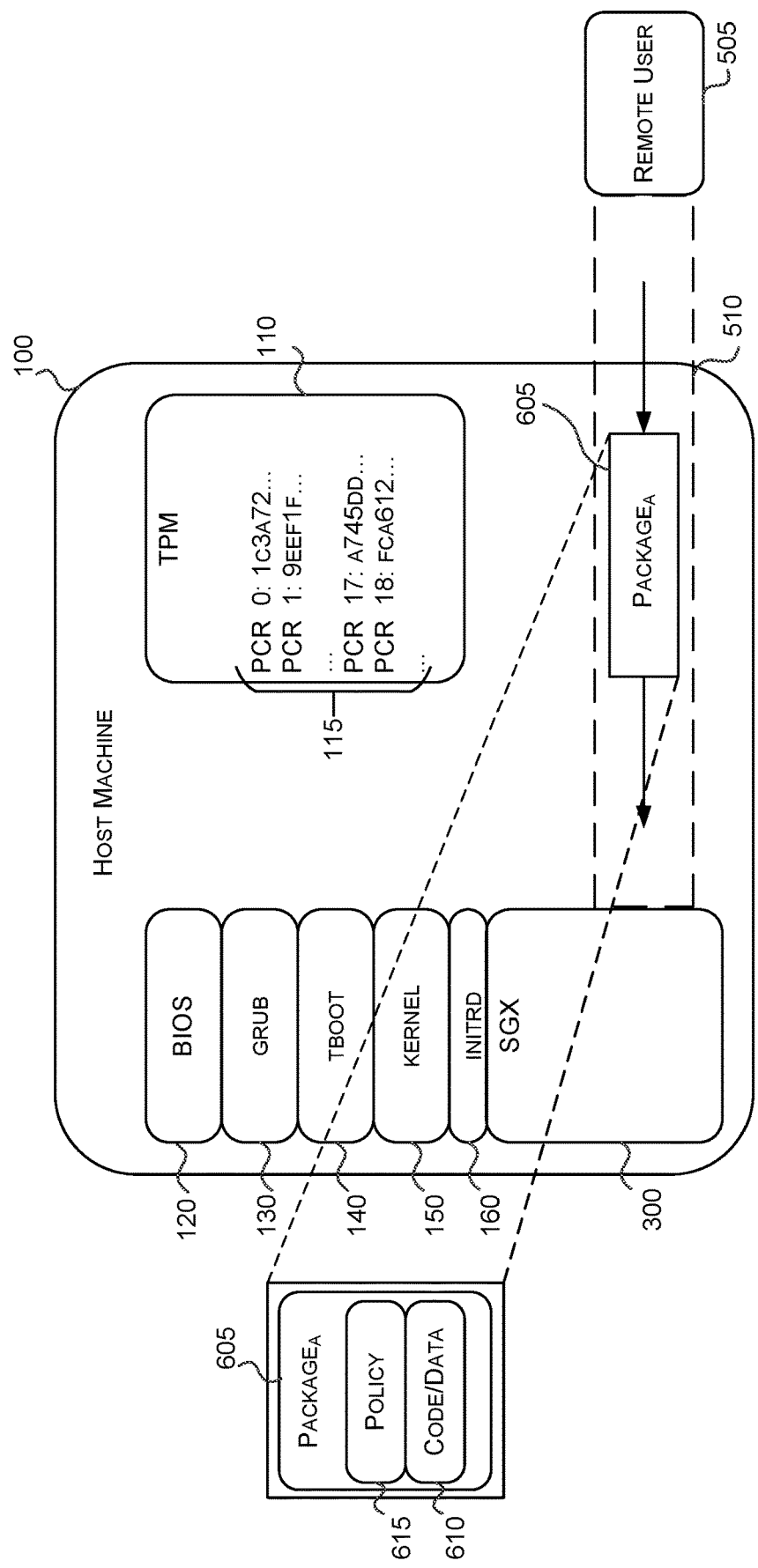
FIG. 6 is a schematic diagram of the host machine of FIG. 5 being provided with a package for processing.
Figure 7:
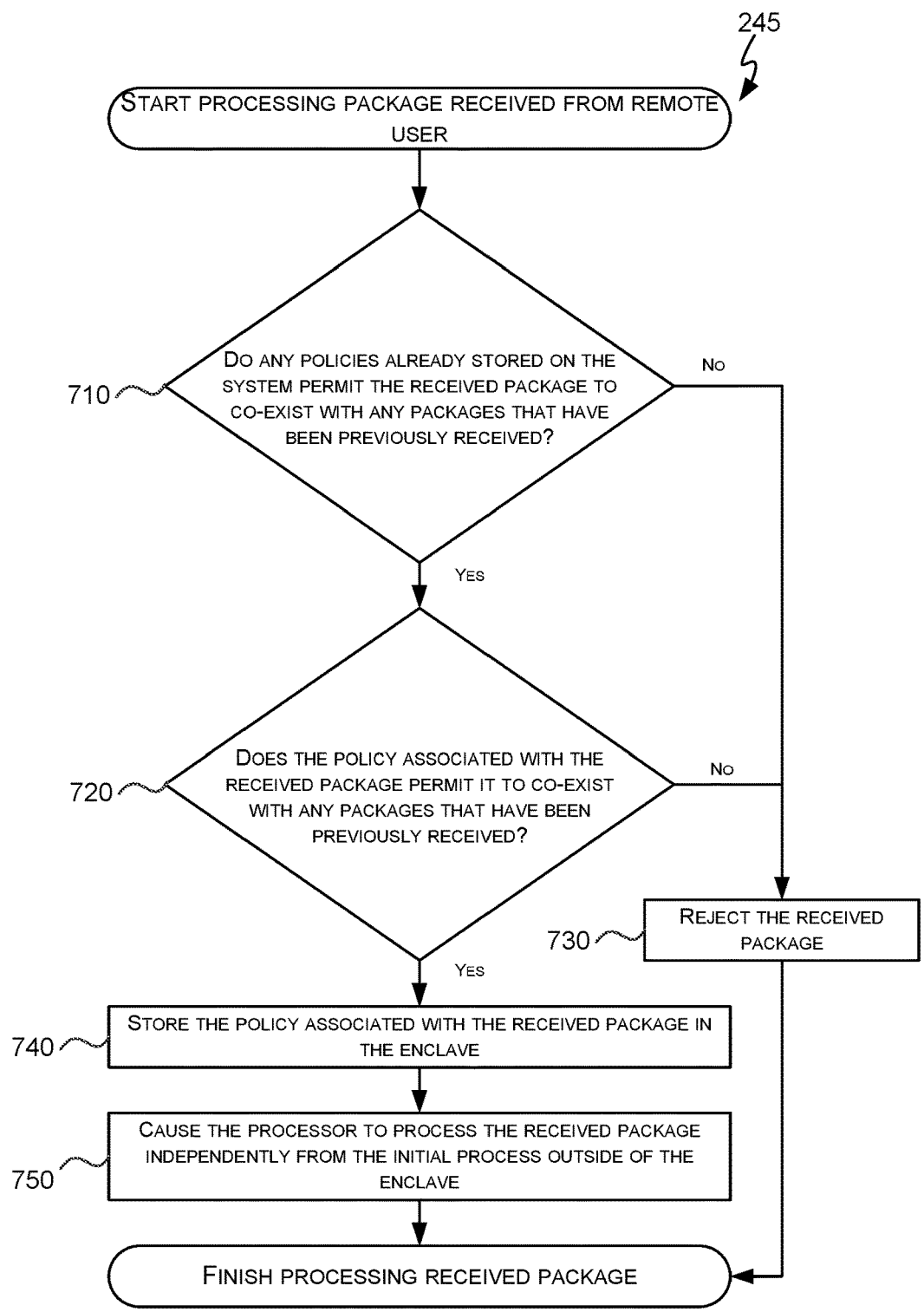
FIG. 7 is a flow diagram of part of the method of FIG. 2 showing operations for processing the package in more detail.

FIG. 6 is a schematic diagram of the host machine 100 of FIG. 5 being provided with a package 605 for processing, as occurs at operation 440 of the method 400 for providing a package for processing at the host machine 100. The package 605 comprises code or data or both 610 for processing by the host machine 100. For the purposes of this description, code may be considered to be instructions which cause the processor to carry out particular actions, whilst data may be values upon which those actions operate. That is to say, the code in a package is directly executed by the host machine 100 whilst data in the package is made available to be accessed by executing instructions. In some examples, processing a package comprising data involves storing the data such that it is available to processes executing on the computer system. Meanwhile, in some examples, processing a package comprising code involves executing the instructions using the processor of the host machine 100. In some examples, the data comprises configuration data which affects the manner in which the code operates. In some examples, the data comprises one or more sets of values, each set of values containing representations of a respective qualitative or quantitative variable. In such examples, the code may comprise instructions for processing the sets of values to provide analysis of the respective qualitative or quantitative variables.

Optionally, the package comprises a policy 615. This policy 615 is called a trust policy because it indicates whether another package is permitted to be processed on the same host machine 100 as the package 605 (i.e. whether another package is permitted to coexist with the package 615 on the host machine 100). For example, the policy 615 includes a hash for each of the other packages that the remote user 505 providing the package 605 will permit to be processed on the same host machine 100 as the package 605. The policy 615 also or alternatively includes public keys of package providers which the remote user 505 trusts. Therefore, any packages which are signed by a private key which corresponds to one of the public keys is permitted to be processed on the same host machine 100 as the package 605. The policy 615 also specifies other conditions which permit or prevent other packages being processed on the same host machine 100 as the package 605. These conditions are based on the current state or other environmental factors of the host machine 100. In some examples, packages which comprise code are only permitted by a policy which contains a hash for that specific package, whereas packages which only consist of data to be processed (for example by code provided with a previous package) are permitted by a policy 615 which contains either a hash of the package or a public key which corresponds to a private key which has been used to sign the packages. In other words, in some examples, a package which is signed by a private key corresponding to one of the one or more public keys included in the policy 615 is only permitted to be processed on the host machine 100 if the signed package does not comprise any code.

Where no policy 615 is provided with the package 605, the host machine 100 either takes a permissive view or a restrictive view as to other packages that are permitted to be processed on the same system. For example, the host machine 100 takes a permissive view in the absence of a policy 615 for a package 605 as meaning that any other packages are permitted to coexist with the package 605. Alternatively, the host machine 100 takes a restrictive view in the absence of a policy 615 for package 605 as meaning that no other packages are permitted to coexist with the package 605. Following this restrictive approach results in the host machine 100 being "single use" in the case where no policies are specified because no other packages are permitted to be processed on the host machine 100 after the package 605 is processed.

Having received the package 605, the method 200 running as the initial process on the host machine 100 proceeds to process the package 605 at operation 245. This is now discussed in more detail in conjunction with FIG. 7 which is a flow diagram of operation 245 of method 200 showing the sub-operations for processing the package in more detail.

At a sub-operation 710, operation 245 determines whether there are any policies stored within the enclave 300 on the host machine 100 which would prevent the received package 605 from being processed by the host machine 100. These policies are policies of previous packages which have already been received by the host machine 100 in previous iterations of operation 245. Additionally or alternatively, the policies are preloaded and stored in the enclave 300 by the initial process itself. For example, the initial process is configured to preload a trusted public key for a package provider which is permitted to process packages on the host machine 100. In any case, where there are already policies stored within the enclave 300 on the host machine 100, operation 245 checks these stored policies to determine whether the received package 605 is permitted to be processed on the host machine 100. If no policies are stored within the enclave 300 on the host machine 100, the package is permitted to be processed on the host machine 100.

The host machine 100 adopts a restrictive or a permissive approach towards its consideration of the overall policy of the host machine 100 represented by the stored policies. Following a restrictive approach, the host machine 100 requires a package to be explicitly permitted by all policies stored in the enclave 300. This approach ultimately results in a narrowing of the packages which are permitted on the host machine 100 as each policy narrows (or, at best, has no effect on) the overall policy for the machine (i.e. the composite of all the policies stored in the enclave 300). However, following a permissive approach, the host machine 100 only requires a single policy to permit the package 605 for it to be allowed to be proceed on the host machine 100. This approach allows for the overall policy of the machine 100 to be expanded beyond the policy of a first package, thereby allowing greater flexibility. However, this approach also reduces the security for package providers, since there is less strict control over the other packages which are permitted to be processed on the same host machine 100.

Sub-operation 710 is optional and, in some examples, the host machine 100 does not explicitly attempt to determine whether a received package is permitted by referring to stored policies. For example, the host machine 100 is a "single use" system, in which case the first package to be received is permitted while any subsequently received packages are not permitted. As a further example, a separate authentication and authorization system is used to restrict access to the host machine 100 to a specific user or group of users. In this case, the host machine 100 accepts any packages which are received, so long as the user is authenticated and authorized to provide packages to the host machine 100. However, the use of policies associated with packages that are provided for processing by the host machine 100 helps provide greater transparency and control over the processing that is performed by the host machine 100 for remote users.

If there are no policies stored within the enclave 300 on the host machine 100 which prevent the received package 605 from being processed by the host machine 100 (i.e. the received package 605 is permitted to coexist with the packages already on the host machine 100), the operation 245 proceeds to a sub-operation 720. Otherwise, the operation 245 proceeds to a sub-operation 750 which is described in more detail later.

At sub-operation 750, the operation 245 determines whether a policy associated with the received package 605 itself permits the package 605 to be processed alongside any other packages which have been received and processed by the host machine 100. As described above, in some examples, the received package 605 does not comprise a policy 615, in which case sub-operation 720 is optional and processing proceeds straight to sub-operation 740. However, where a policy 615 is provided with the received package 605, the operation 245 checks, for each of the packages that have been previously processed by the host machine 100, whether that package is permitted to be processed on the same system as the received package 605 according to the policy 615 of the received package 605. Accordingly, the operation 245 carries out a two-part check as to whether a package 605 is permitted on the host machine 100. The first check carried out at sub-operation 710 based on the composite policy of all policies received previously, and the second check carried out at sub-operation 720 based on the policy 615 provided with the package 605 itself. In this manner, the operation 245 can prevent packages which are permitted to coexist with each other from being processed on the host machine 100.

If it is determined at either sub-operation 710 or sub-operation 720 that the received package 605 cannot be processed by the host machine 100 due to a policy conflict, operation 245 proceeds to a sub-operation 730 in which the package 605 is rejected. The rejection of the package ends the operation 245. In some examples, operation 245 sends a response 605 to the remote user 505 to notify them that their package 605 has been rejected (and has not therefore been processed). In some examples, the response includes details as to why the package 605 was not processed. For example, the response identifies the policy which prevented the package 605 from being processed.

At a sub-operation 740, the operation 245 stores the policy 615 associated with the received package 605 in the enclave. The policy 615 is then used in future iterations of operation 245 when subsequent packages are received to prevent or permit the subsequent packages from being provided to and processed by the host system 100. By storing the policy 615 in the enclave its integrity and confidentiality from other processes executing on the host machine 100 is assured. This means that the policies stored in the enclave cannot be tampered with by any other process on the machine (such as, for example, code provided for processing with a subsequent package). As mentioned above, in some examples, the received package 605 might not comprise a policy 615. In this case, sub-operation 740 is optional, in which case processing proceeds directly to a sub-operation 750.

At a sub-operation 750, the operation 245 causes the processor to process the package 605 independently from the initial process outside of the enclave 300. By processing the package 605 independently from the initial process outside of the enclave 300, the package 605 is not limited by the relatively restrictive execution environment that is provided by the enclave 300. This means that the package 605 is able to take full (or at least greater) advantage of the execution environment provided by the host machine 100. At the same time, by processing the package 605 independently from the initial process outside of the enclave 300, the initial process and its data (such as any stored policies) are protected from any processing performed by the package 605. This means that processing of packages on the system cannot alter the behavior of the initial process. After causing the processor of the host machine 100 to process the package 605, operation 245 finishes and method 200 (shown in FIG. 2) returns to operation 240 to either wait for a further package or terminate the initial process.

Figure 8:
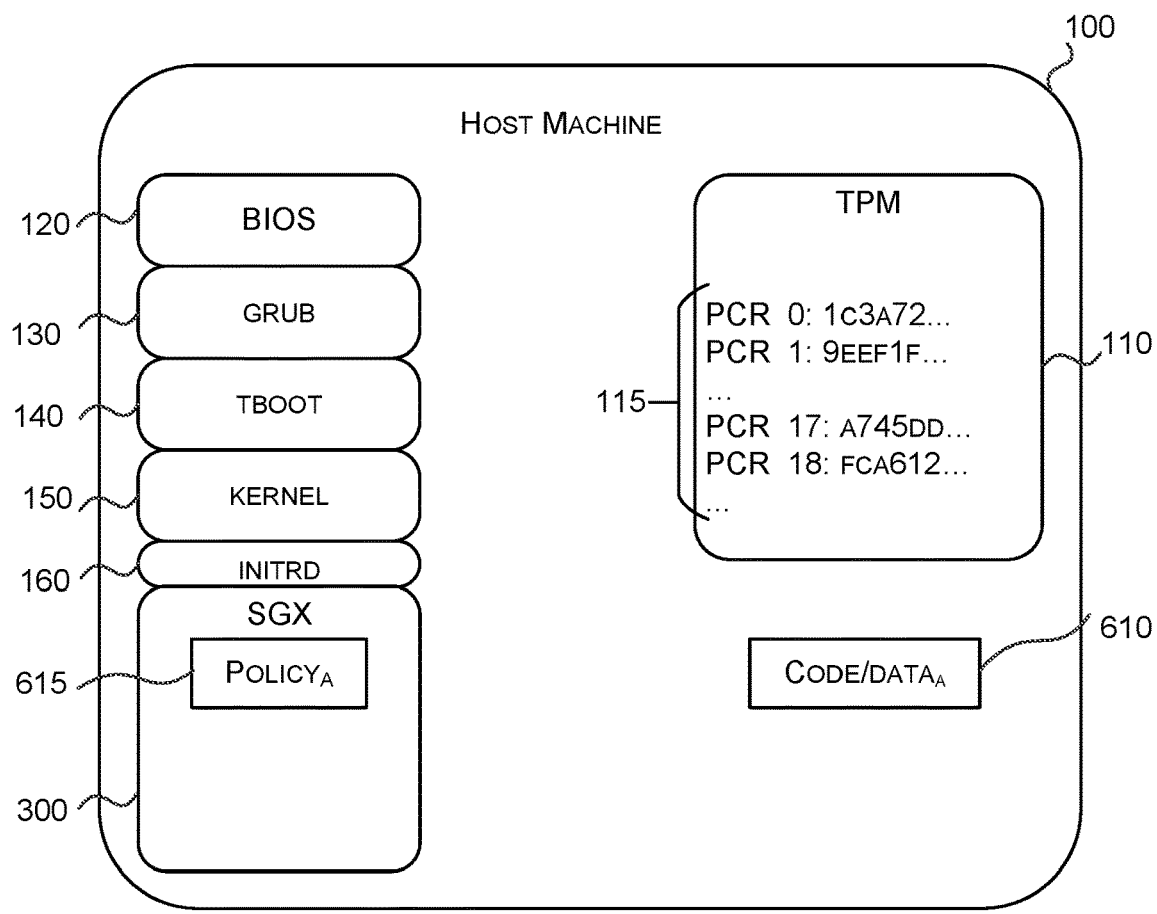
FIG. 8 is a schematic diagram of the host machine of FIG. 6 processing the package.

FIG. 8 is a schematic diagram of the host machine 100 illustrated by FIG. 6 processing the package 605. In particular, following the operation of sub-operation 740 of operation 245, the policy 610 has been stored in the enclave 300. Meanwhile, following the operation of sub-operation 750 of operation 245, the code or data or both 610 of the package 605 is being processed independently from the initial process and outside of the enclave 300.

Figure 9:
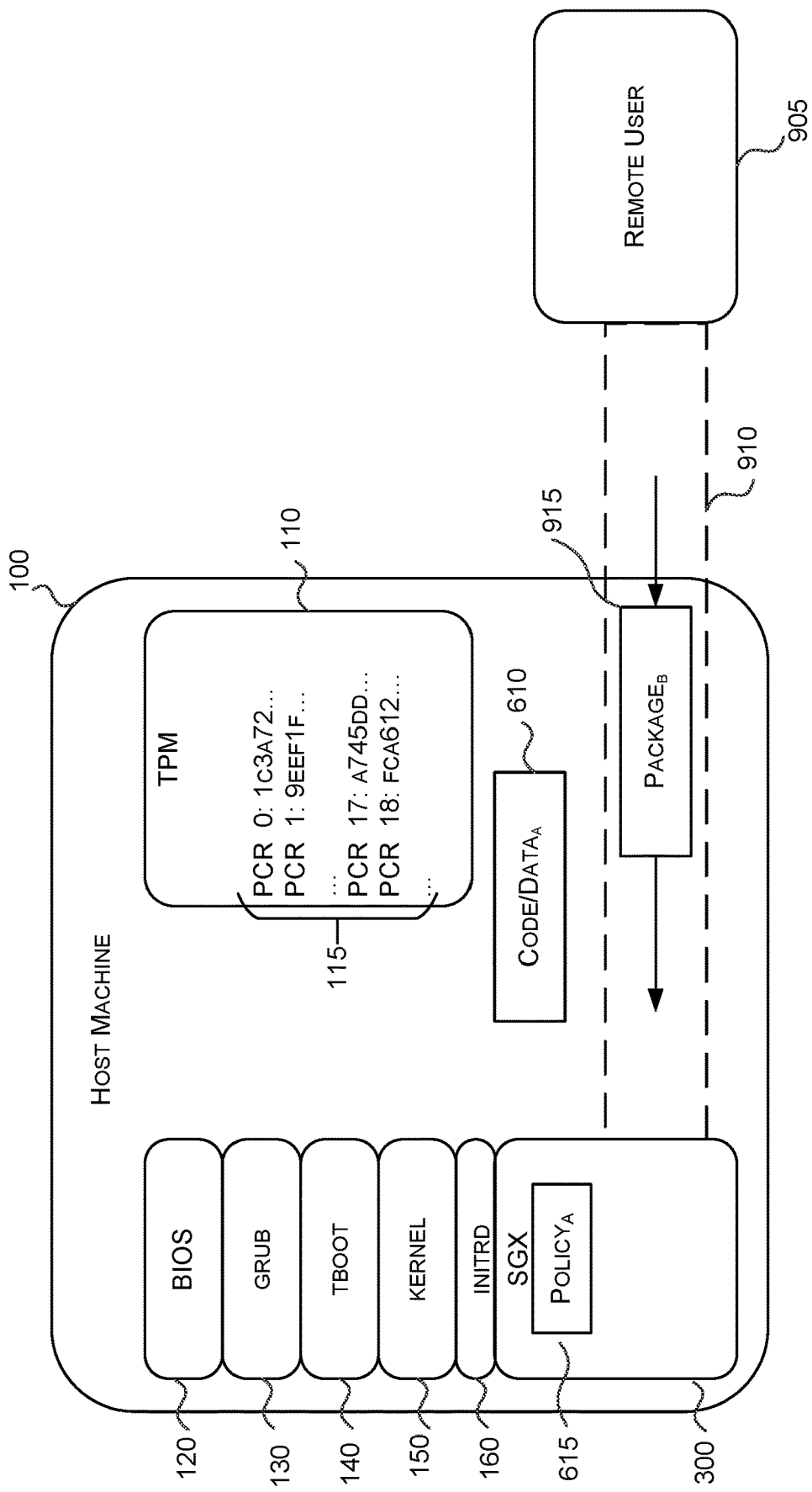
FIG. 9 is a schematic diagram of the host machine of FIG. 8 being provided with a subsequent package for processing.

FIG. 9 is a schematic diagram of the host machine 100 illustrated by FIG. 8 being provided with a subsequent package 915 for processing. A remote user 905 follows the same method 400 as discussed above in relation to FIG. 4 to provide the package 915. Specifically, the remote user 905 creates a secure connection 910 to the host machine 100 and, after verifying that the secure enclave is a genuine enclave and is running the expected initial process (i.e. the predetermined initial process that the remote user 905 is expecting), provides a package 915 for processing by the host machine 100. The remote user 905 providing the subsequent package 915 is the same remote user 505 that provided a previous package 605 or is a different user. Where the remote user 905 is the same user 505 that provided a previous package 605, the secure connection 910 is, in some cases, the same connection 510 that was used to provide the previous package 605. Of course, in other cases, the secure connection 910 is a different connection, even where the remote user 905 is the same user 505 that provided a previous package 605.

Figure 10:
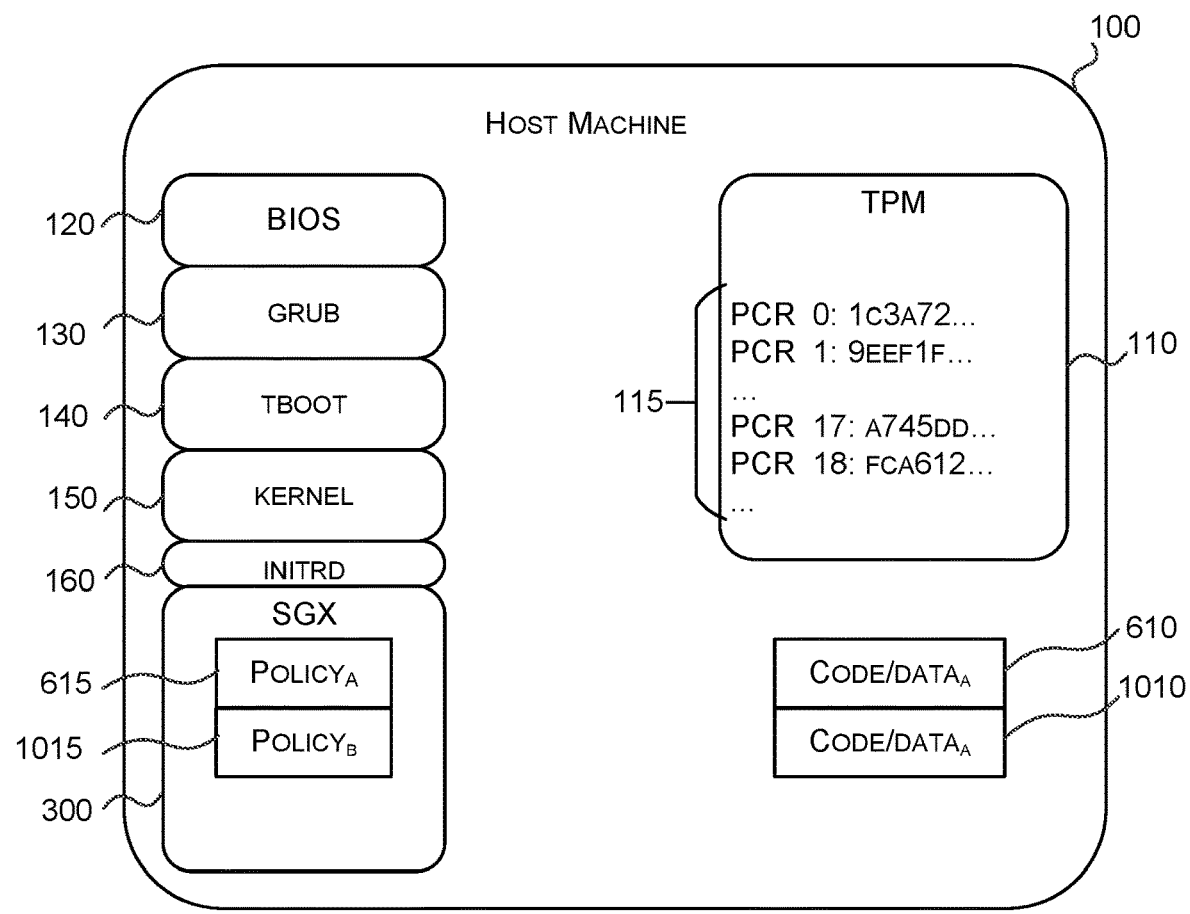
FIG. 10 is a schematic diagram of the host machine of FIG. 9 processing the subsequent package.

The processing of the subsequent package 915 is discussed further in conjunction with FIG. 10 which is a schematic diagram of the host machine 100 of FIG. 9 processing the subsequent package. As discussed above, the subsequent package 915 comprises code or data or both 1010 and, optionally, includes a policy 1015. When the subsequent package 915 is received the method 200 running as the initial process on the host machine 100 proceeds to process the package at operation 245.

At sub-operation 710, operation 245 checks that the subsequent package 915 is permitted to be processed on the same host machine 100 as the previous package 605 based, at least in part, on the policy 615 for the previous package 605 which was previously received and stored in the enclave 300. In other words, operation 245 checks the policy 615 to determine whether it indicates that the subsequent package 915 is permitted by the policy 615 (for example, by comparing a hash of the subsequent package 915 with hashes included in the policy 615). Since, in this example, the policy 615 for the previous package 605 permits the subsequent package 915 to coexist on the same host machine 100, the operation 245 proceeds to sub-operation 720. However, if the policy 615 for the previous package 605 did not permit the subsequent package 915 to coexist on the same host machine 100, operation 245 proceeds to reject the subsequent package by proceeding to sub-operation 730.

At sub-operation 720, operation 245 checks that the subsequent package 915 is permitted to be processed on the same host machine 100 as the previous package 605 based, at least in part, on the policy 1015 for the subsequent package 915. In other words, operation 245 checks the policy 1015 for the subsequent package 915 to determine whether it indicates that the previous package 605 is permitted by the policy 1015 (for example, by comparing a hash of the previous package 605 with hashes included in the policy 1015). Since, in this example, the policy 1015 for the subsequent package 915 permits the subsequent package 915 to coexist on the same host machine 100 as the previous package 605, the operation 245 proceeds to sub-operation 750. However, if the policy 1015 for the subsequent package 915 did not permit the subsequent package 915 to coexist on the same host machine 100 as the previous package 605, operation 245 would proceed to reject the subsequent package by proceeding to sub-operation 730.

At sub-operation 740, operation 245 stores the policy 1015 associated with the subsequent package 915 in the enclave 300 together with any previously received policies (e.g. policy 615). This means that both of the policies 615 and 915 are considered when determining whether to process any further packages. The operation 245 then proceeds to sub-operation 750.

At sub-operation 750, operation 245 causes the processor of the host machine 100 to process the subsequent package 915 independently from the initial process outside of the enclave 300. This means that both packages 615 and 915 are processed together on the host machine 100 outside of the enclave. As an example, the original package 605 comprises data, whilst the subsequent package 915 comprises code for carrying out an analysis of that data. Further packages may be received from numerous different parties to add additional data and/or code to be processed on the host machine 100 (provided that any specified policies have been satisfied). In some examples, the host machine 100 also processes packages which are loaded automatically by the initial process (i.e. which are loaded without having been received from a remote user). These automatically loaded packages serve to provide functionality which may be utilized by packages which are received from remote users.

Even though the remote user 505 and 905 does not necessarily know what other packages have already been received and processed by the host machine 100 or what packages might be subsequently received and processed, the remote user 505 and 905 is able to verify the initial process that is running method 200 in the enclave 300 is an expected initial process (i.e. it is equivalent to a predetermined process which the user 505 and 905 is expecting to run as the initial process on the host machine 100) which operates in a manner which is known to the user 505 and 905. Therefore, the user 505 and 905 is assured that the initial process will verify that the initial state of the host system 100 matches a predetermined state to ensure that only trusted components were executed during the boot process. The user 505 and 905 is also assured that the initial process will operate method 200 on the host machine 100 to prevent their package from being processed if it is incompatible with (i.e. not allowed to coexist with) the packages already processed by the host machine 100. Similarly, the user 505 and 905 is assured that the initial process will operate method 200 on the host machine 100 to prevent further packages being processed by the machine which are incompatible with the user's package 605 and 915 as specified by the policy 615 and 1015 provided with the package 605 and 915.

Although in the above description, the user 505 and 905 has been described as being remote from the host machine 100, in other examples, at least one of the users 505 and 905 is local to the host machine 100. The process by which a local user 505 provides packages to the host machine 100 for processing is the same as for a remote user. That is, the local user verifies that the initial process is the correct initial process and that it is running inside an enclave. The local user provides a package to be processed to the initial process, which proceeds to process the package if all policies stored in the initial processes' enclave and associated with the package itself have been satisfied. In this sense, it will be appreciated that the initial process acts as a kind of gateway, being the only way of providing packages to the host machine 100 for processing and controlling which packages are processed based on associated policies, regardless of whether a user is local to or remote from the host machine 100. Where local use of the host machine 100 is supported, the initial process provides some more advanced functionality akin to that provided by operating systems to aid the user in providing packages to the initial process on the host-machine for processing. Similarly, although the term user is used, it will be appreciated that, in some examples, the user may be an automated entity.

In some examples, the host machine 100 may be provided as computer within a cloud computing environment. One aspect of a cloud computing environment is the provision of on-demand computing resources to users. In particular, in some cases, when using a cloud computing environment a user, is dynamically allocated computing resources. In such cases, the user may not know any previous information about the computing resource (i.e. host machine 100) prior to its allocation to the user. Therefore, the user might not know what processes have already been run or are running on the host machine. However, by providing the host machine 100 as a computing resource within the cloud computing environment, the above-described method for providing packages, as illustrated in FIG. 4, enables the user to verify that the current state of the host machine 100 is acceptable to them (i.e. that it is operating in a predetermined manner based on the operation of the predetermined process starting from a predetermined state). However, it will of course be appreciated that the same method can be used to verify host machines 100 outside of a cloud computing environment.

Figure 11:
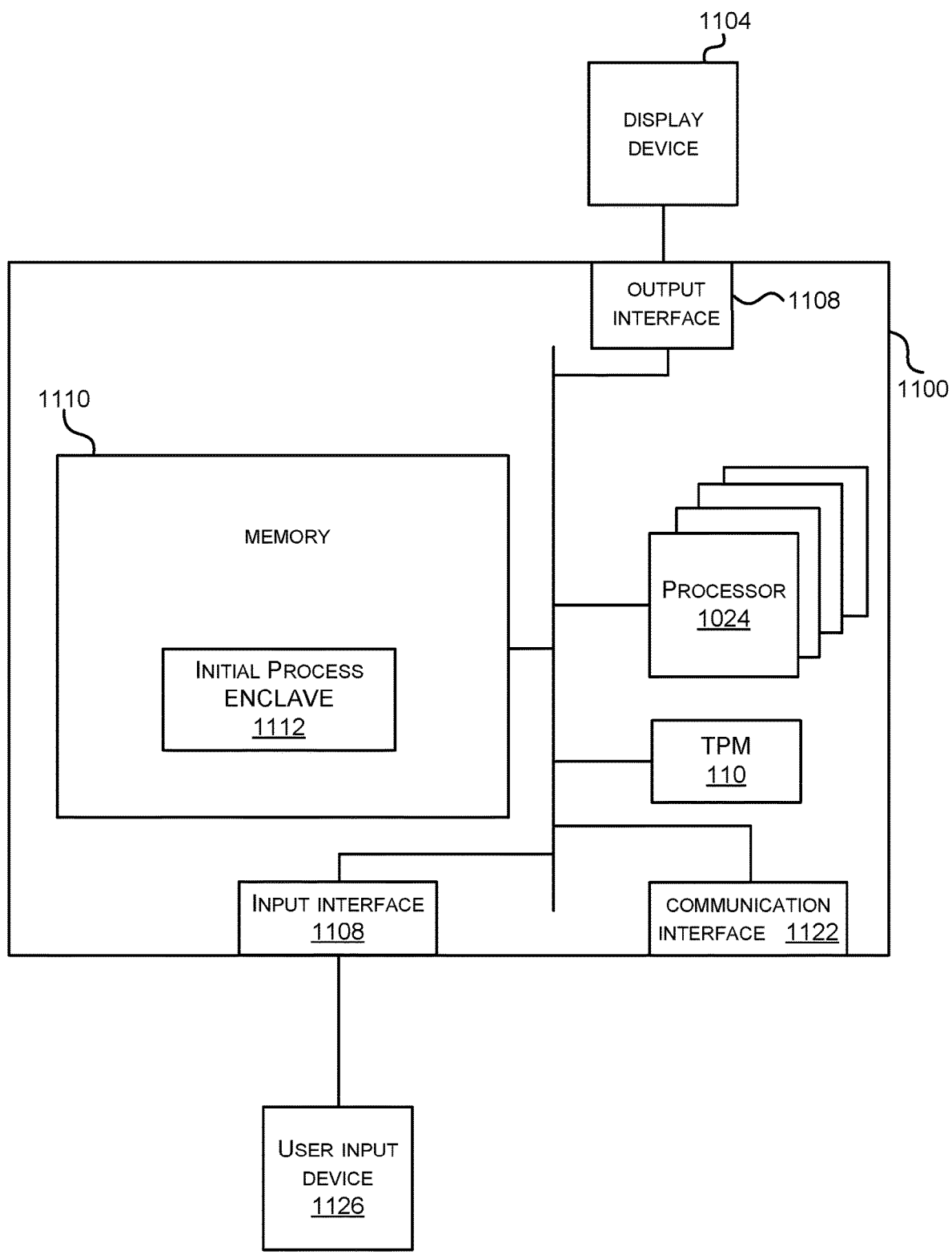
FIG. 11 illustrates an exemplary computing-based device in which embodiments of a package processing system and computer-implemented method for providing packages for processing are implemented.

FIG. 11 illustrates an exemplary computing-based device in which embodiments of a package processing system and computer-implemented method for providing packages for processing are implemented.

Computing-based device 1100 comprises one or more processors 1124 which are microprocessors, controllers or any other suitable type of processors for processing computer executable instructions to control the operation of the device in order to operate as the above-described host machine 100 or to carry out the method 400 for providing packages to the host machine 100 for processing. In some examples, for example where a system on a chip architecture is used, the processors 1124 include one or more fixed function blocks (also referred to as accelerators) which implement a part of the methods of FIGS. 2, 4 and 7 in hardware (rather than software or firmware).

The computer executable instructions are provided using any computer-readable media that is accessible by computing based device 1100. Computer-readable media includes, for example, computer storage media such as memory 1112 and communications media. Computer storage media, such as memory 1112, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1112) is shown within the computing-based device 1112 it will be appreciated that the storage is, in some examples, distributed or located remotely and accessed via a network or other communication link (e.g. using communication interface 1122).

The computing-based device 1100 also comprises an input/output controller 1108 arranged to output display information to a display device 1104 which may be separate from or integral to the computing-based device 1100. The display information may provide a graphical user interface. The input/output controller 1108 is also arranged to receive and process input from one or more devices, such as a user input device 1126 (e.g. a mouse, keyboard, camera, microphone or other sensor). In some examples the user input device 1126 detects voice input, user gestures or other user actions and provides a natural user interface (NUI). In an embodiment the display device 1104 also acts as the user input device 1126 if it is a touch sensitive display device. The input/output controller 1108 outputs data to devices other than the display device in some examples, e.g. a locally connected printing device (not shown in FIG. 11). Of course, in some examples, the computing-based device 1100 may operate as a headless server, without a permanently connected display device 1104 or user input device 1126. In this configuration, the computing-based device 1100 may rely on communication interface 1122 for all input/output.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Alternatively or in addition to the examples described herein, examples include any combination of the following:

A system comprising: a processor; and a security module arranged to store data representing measurements of each of a plurality of code modules which are to be executed by the processor as part of a boot process for the system; wherein, the system is configured to cause the processor to execute an initial process after completion of the boot process, the initial process being operable to: create an enclave for the initial process, wherein a state of the enclave is remotely verifiable and processing performed by the initial process is performed from within the enclave; retrieve a quote from the security module, the quote comprising a representation of the measurements of the plurality of code modules executed by the processor during the boot process; determine whether an initial state of the system is equivalent to a predetermined state based on the retrieved quote; and when the initial state of the system is equivalent to the predetermined state: receive a package comprising code or data or both to be processed by the system; and cause the processor to process the package outside of the enclave.

The system described above, wherein the package further comprises a policy indicating whether another package is permitted to be processed on the same system as the package, wherein the initial process is further operable to: store the policy within the enclave; receive one or more subsequent packages comprising code or data or both; and, for each subsequent package: determine whether that subsequent package is permitted to be processed on the same system as packages previously processed by the system based, at least in part, on whether policies already stored within the enclave permit the subsequent package to be processed on the same system; and in response to determining that the subsequent package is permitted to be processed by the system, cause the processor to process the subsequent package outside of the enclave.

The system described above, wherein the policy comprises a respective hash of one or more packages that are permitted to be processed on the same system as the package.

The system described above, wherein the policy comprises one or more public keys, wherein a package which is signed by a private key corresponding to one of the one or more public keys is permitted to be processed on the same system as the package.

The system described above, wherein a package which is signed by a private key corresponding to one of the one or more public keys is only permitted to be processed on the system when the signed package does not comprise any code.

The system described above, wherein one or more of the subsequent packages further comprise a respective policy, and wherein determining whether each of the one or more of the subsequent packages is permitted to be processed by the system is further based, at least in part, on whether the policy of the subsequent package permits the subsequent package to be processed on the same system as the packages previously processed by the system, and wherein the initial process is further operable to store the policy for the subsequent package in the enclave in response to determining that the subsequent package is permitted to be processed.

The system described above, wherein the initial process is further operable to: instruct the security module to store arbitrary data as one or more additional measurements.

The system described above, wherein the initial process is further operable to: retrieve a second quote from the security module, the second quote including a representation of the measurements stored in the security module following the storage of one or more additional measurements; and determine whether the measurements represented in the second quote are different from the measurements represented in the quote.

The system described above, wherein the initial process is further operable to instruct the security module to store additional arbitrary data as one or more additional measurements in response to determining that the measurements represented in the second quote are the same as the measurements represented in the quote.

The system described above, wherein the initial process is further operable to prevent the receipt or processing of packages when it is determined that the measurements represented in the second quote are the same as the measurements represented in the first quote.

The system described above, wherein the initial process is further operable to: determine whether an owner password has been defined for the security module; and in response to determining that no owner password has been defined: set an owner password for the security module; and store the owner password in the security module sealed to the current state of the system prior to instructing the security module to store arbitrary data.

A computer-implemented method for providing packages for processing on a computer system, the method comprising: creating a secure connection to an enclave on the computer system; requesting an enclave quote from the enclave; verifying, using the enclave quote, that the enclave is a genuine enclave and that the process running in the enclave is a predetermined process which is configured to determine whether the initial state of the computer system is equivalent to a predetermined state, the predetermined state comprising the predetermined process being executed as an initial process after completion of a boot process for the computer system, and, when the initial state is equivalent to the predetermined state, to receive one or more packages for processing and cause the one or more packages to be processed outside of the enclave; and in response to verifying that the enclave is a genuine enclave and the process running in the enclave is the predetermined process: provide a package comprising code or data or both to be processed by the computer system using the secure connection.

The computer-implemented method described above, wherein the provided package further comprises a policy indicating whether another package is permitted to be processed on the same system as the provided package, wherein the predetermined process is further configured to: store the policy within the enclave; receive one or more subsequent packages comprising code or data or both; and, for each subsequent package: determine whether that subsequent package is permitted to be processed on the same system as all packages previously processed by the computer system, based, at least in part, on whether all policies already stored within the enclave permit the subsequent package to be processed on the same system; and in response to determining that the subsequent package is permitted to be processed by the computer system, cause the processor to process the subsequent package independently from the predetermined process outside of the enclave.

The computer-implemented method described above, wherein the policy comprises a respective hash of one or more packages that are permitted to be processed on the same system as the provided package.

The computer-implemented method described above, wherein the policy comprises one or more public keys, wherein a package signed by a private key corresponding to one of the one or more public keys is permitted to be processed on the same system as the package.

The computer-implemented method described above, wherein a package which is signed by a private key corresponding to one of the one or more public keys is only permitted to be processed on the system when the signed package does not comprise any code.

The computer-implemented method described above, wherein one or more of the subsequent packages further comprises a respective policy, and wherein determining whether each of the one or more of the subsequent packages is permitted to be processed by the system by the predetermined process is further based, at least in part, on whether the policy of the subsequent package permits the subsequent package to be processed on the same system as the packages previously processed by the remote computer system, and wherein the predetermined process is further configured to store the policy for the subsequent package in the enclave in response to determining that the subsequent package is permitted to be processed.

The computer-implemented method described above, wherein verifying that the enclave is a genuine enclave comprises providing the quote to an enclave attestation service to verify that the quote was produced by a genuine enclave.

A system which is configured to: create a secure connection to an enclave on a remote computer system; request an enclave quote from the enclave; verify, using the enclave quote, that the enclave is a genuine enclave and that the process running in the enclave is a predetermined process which is configured to determine whether the initial state of the remote computer system is equivalent to a predetermined state, the predetermined state comprising the predetermined process being executed as an initial process after completion of a boot process for the remote computer system, and, when the initial state is equivalent to the predetermined state, to receive one or more packages for processing and cause the one or more packages to be processed outside of the enclave; and in response to verifying that the enclave is a genuine enclave and the process running in the enclave is the predetermined process: provide a package comprising code or data or both to be processed by the remote computer system using the secure connection.

A non-transitory computer-readable medium comprising a plurality of computer-instructions which, when executed by a computer system cause the computer system to: create an enclave for a process in which the computer-instructions are to be executed, wherein processing performed by the process is performed from within the enclave; retrieve a quote from a security module of the computer system, the quote comprising a representation of the measurements stored by the security module of a plurality of code modules executed by the processor during a boot process of the computer system; determine whether an initial state of the computer system is equivalent to a predetermined state based on the retrieved quote, wherein the predetermined state of the computer system includes the process being executed as an initial process after completion of the boot process; instruct the security module to store arbitrary data as one or more additional measurements; and when the initial state of the system is equivalent to the predetermined state: receive a package comprising code or data or both to be processed by the system; and cause the processor to process the package outside of the enclave.

The non-transitory computer-readable medium described above, wherein the package further comprises a policy indicating whether another package is permitted to be processed on the same system as the package, and wherein the plurality of computer-instructions, when executed by the computer system, further cause the computer system to: store the policy within the enclave; receive one or more subsequent packages comprising code or data or both; and, for each subsequent package: determine whether that subsequent package is permitted to be processed on the same system as packages previously processed by the system based, at least in part, on whether policies already stored within the enclave permit the subsequent package to be processed on the same system; and in response to determining that the subsequent package is permitted to be processed by the system, cause the processor to process the subsequent package outside of the enclave.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A system comprising:
   a hardware processor; and
   a security module arranged to store data representing measurements of each of a plurality of code modules which are to be executed by the hardware processor as part of a boot process for the system;
   wherein, the system is configured to cause the hardware processor to execute an initial process after completion of the boot process and before any subsequent processes, the initial process being operable to:
   create an enclave for the initial process, wherein a state of the enclave is remotely verifiable and processing performed by the initial process is performed from within the enclave;
   retrieve a quote from the security module, the quote comprising a representation of the measurements of the plurality of code modules executed by the hardware processor during the boot process;
   determine that an initial state of the system is equivalent to a predetermined state based on the retrieved quote; and
   receive a package comprising code or data or both to be processed by the system; and
   cause the hardware processor to process the package outside of the enclave.

2. The system according to claim 1, wherein the package further comprises a policy indicating whether another package is permitted to be processed on the same system as the package, wherein the initial process is further operable to:
   store the policy within the enclave;
   receive one or more subsequent packages comprising code or data or both;
   and, for each subsequent package:
   determine whether that subsequent package is permitted to be processed on the same system as packages previously processed by the system based, at least in part, on whether policies already stored within the enclave permit the subsequent package to be processed on the same system; and in response to determining that the subsequent package is permitted to be processed by the system, cause the hardware processor to process the subsequent package outside of the enclave.

3. The system according to claim 2, wherein the policy comprises a respective hash of one or more packages that are permitted to be processed on the same system as the package.

4. The system according to claim 2, wherein the policy comprises one or more public keys, wherein a package which is signed by a private key corresponding to one of the one or more public keys is permitted to be processed on the same system as the package.

5. The system according to claim 4, wherein a package which is signed by a private key corresponding to one of the one or more public keys is only permitted to be processed on the system when the signed package does not comprise any code.

6. The system according to claim 2, wherein one or more of the subsequent packages further comprise a respective policy, and wherein determining whether each of the one or more of the subsequent packages is permitted to be processed by the system is further based, at least in part, on whether the policy of the subsequent package permits the subsequent package to be processed on the same system as the packages previously processed by the system, and wherein the initial process is further operable to store the policy for the subsequent package in the enclave in response to determining that the subsequent package is permitted to be processed.

7. The system according to claim 1, wherein the initial process is further operable to:
instruct the security module to store arbitrary data as one or more additional measurements.

8. The system according to claim 7, wherein the initial process is further operable to:
retrieve a second quote from the security module, the second quote including a representation of the measurements stored in the security module following the storage of one or more additional measurements; and
determine whether the measurements represented in the second quote are different from the measurements represented in the quote.

9. The system according to claim 8, wherein the initial process is further operable to instruct the security module to store additional arbitrary data as one or more additional measurements in response to determining that the measurements represented in the second quote are the same as the measurements represented in the quote.

10. The system according to claim 8, wherein the initial process is further operable to prevent the receipt or processing of packages when it is determined that the measurements represented in the second quote are the same as the measurements represented in the first quote.

11. The system according to claim 1, wherein the initial process is further operable to:
determine whether an owner password has been defined for the security module; and
in response to determining that no owner password has been defined:
set an owner password for the security module; and
store the owner password in the security module sealed to the current state of the system prior to instructing the security module to store arbitrary data.

12. A computer-implemented method for providing packages for processing on a computer system, the method comprising:

creating a secure connection to an enclave on the computer system;
requesting an enclave quote from the enclave;
verifying, using the enclave quote, that the enclave is a genuine enclave and that the process running in the enclave is a predetermined process which is configured to determine that the initial state of the computer system is equivalent to a predetermined state, the predetermined state comprising the predetermined process being executed as an initial process after completion of a boot process and before any subsequent processes for the computer system, and receive one or more packages for processing and cause the one or more packages to be processed outside of the enclave; and
in response to verifying that the enclave is a genuine enclave and the process running in the enclave is the predetermined process:
provide a package comprising code or data or both to be processed by the computer system using the secure connection.

13. The computer-implemented method according to claim 12, wherein the provided package further comprises a policy indicating whether another package is permitted to be processed on the same system as the provided package, wherein the predetermined process is further configured to:
store the policy within the enclave;
receive one or more subsequent packages comprising code or data or both;
and, for each subsequent package:
determine whether that subsequent package is permitted to be processed on the same system as all packages previously processed by the computer system, based, at least in part, on whether all policies already stored within the enclave permit the subsequent package to be processed on the same system; and
in response to determining that the subsequent package is permitted to be processed by the computer system, process the subsequent package independently from the predetermined process outside of the enclave.

14. The computer-implemented method according to claim 13, wherein the policy comprises a respective hash of one or more packages that are permitted to be processed on the same system as the provided package.

15. The computer-implemented method according to claim 13, wherein the policy comprises one or more public keys, wherein a package signed by a private key corresponding to one of the one or more public keys is permitted to be processed on the same system as the package.

16. The computer-implemented method according to claim 15, wherein a package which is signed by a private key corresponding to one of the one or more public keys is only permitted to be processed on the system when the signed package does not comprise any code.

17. The computer-implemented method according to claim 13, wherein one or more of the subsequent packages further comprises a respective policy, and wherein determining whether each of the one or more of the subsequent packages is permitted to be processed by the system by the predetermined process is further based, at least in part, on whether the policy of the subsequent package permits the subsequent package to be processed on the same system as the packages previously processed by the remote computer system, and wherein the predetermined process is further configured to store the policy for the subsequent package in the enclave in response to determining that the subsequent package is permitted to be processed.

18. The computer-implemented method according to claim 12, wherein verifying that the enclave is a genuine enclave comprises providing the quote to an enclave attestation service to verify that the quote was produced by a genuine enclave.

19. A non-transitory computer-readable medium comprising a plurality of computer-instructions which, when executed by a computer system cause the computer system to:
  create an enclave for a process in which the computer-instructions are to be executed, wherein processing performed by the process is performed from within the enclave;
  retrieve a quote from a security module of the computer system, the quote comprising a representation of the measurements stored by the security module of a plurality of code modules executed by a hardware processor during a boot process of the computer system;
  determine that an initial state of the computer system is equivalent to a predetermined state based on the retrieved quote, wherein the predetermined state of the computer system includes the process being executed as an initial process after completion of the boot process and before any subsequent processes;
  instruct the security module to store arbitrary data as one or more additional measurements; and
  receive a package comprising code or data or both to be processed by the system; and
  cause the hardware processor to process the package outside of the enclave.

20. The non-transitory computer-readable medium according to claim 19, wherein the package further comprises a policy indicating whether another package is permitted to be processed on the same system as the package, and wherein the plurality of computer-instructions, when executed by the computer system, further cause the computer system to:
  store the policy within the enclave;
  receive one or more subsequent packages comprising code or data or both;
  and, for each subsequent package:
  determine whether that subsequent package is permitted to be processed on the same system as packages previously processed by the system based, at least in part, on whether policies already stored within the enclave permit the subsequent package to be processed on the same system; and
  in response to determining that the subsequent package is permitted to be processed by the system, cause the processor to process the subsequent package outside of the enclave.

\* \* \* \* \*